United States Patent Office 3,546,107
Patented Dec. 8, 1970

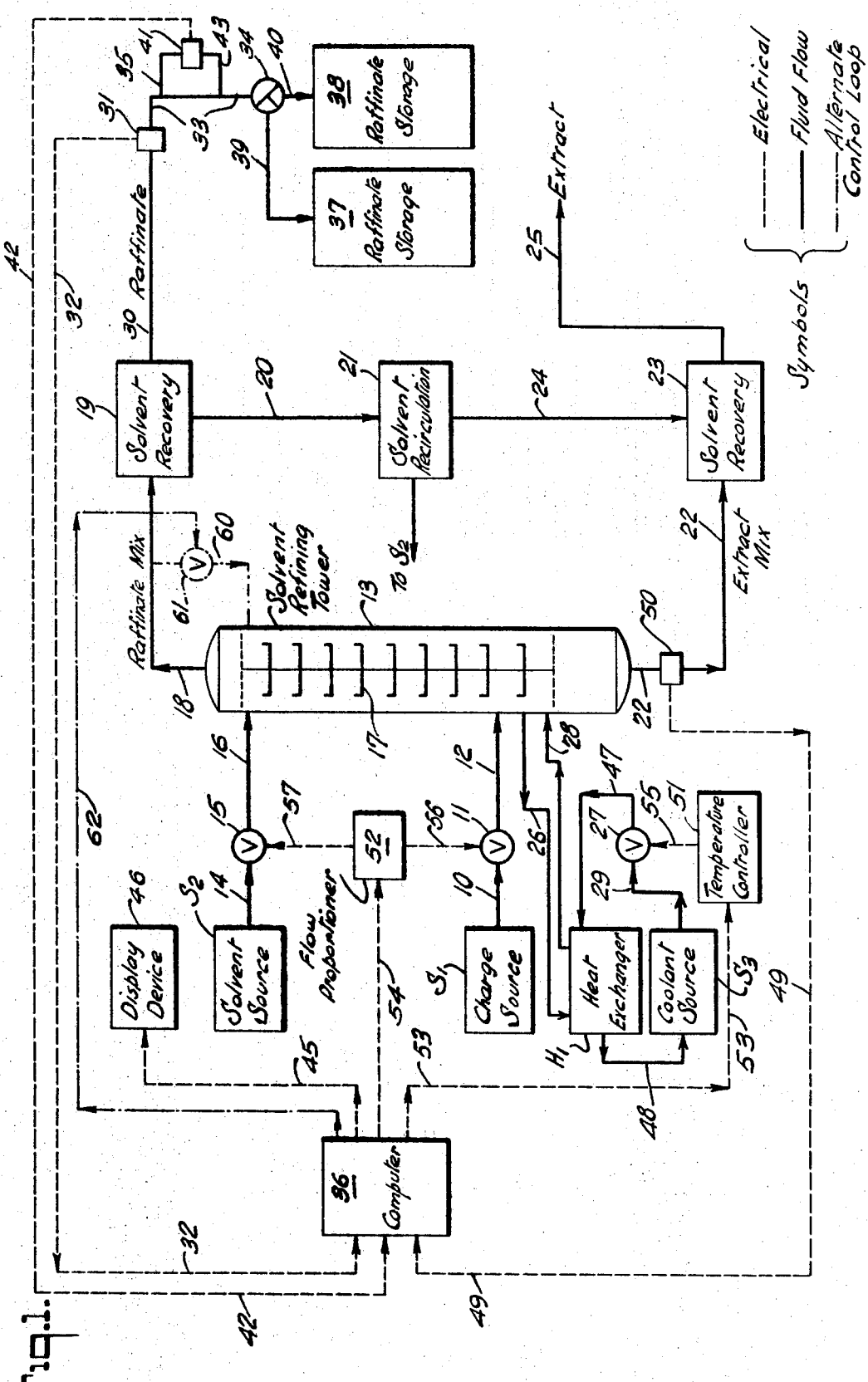

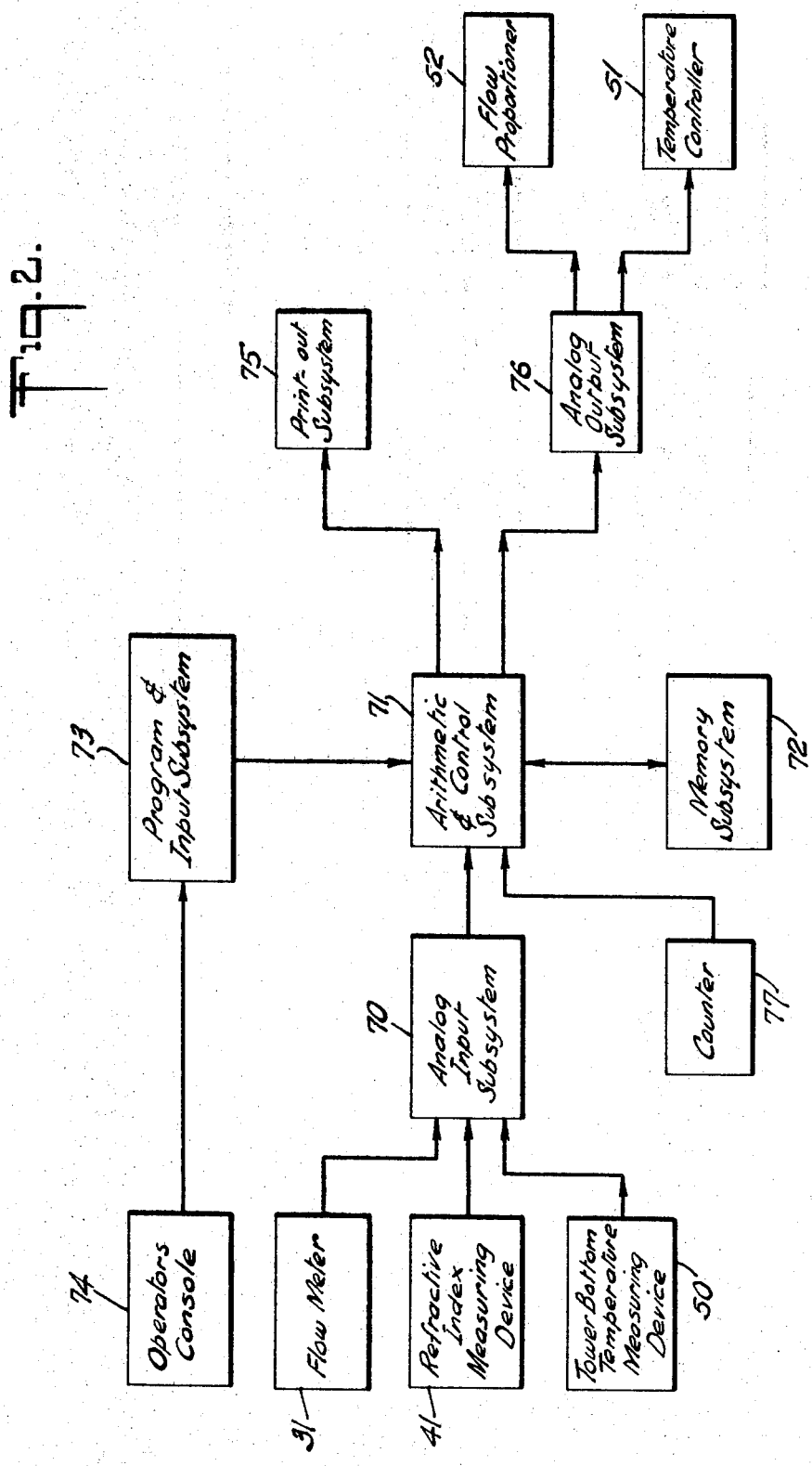

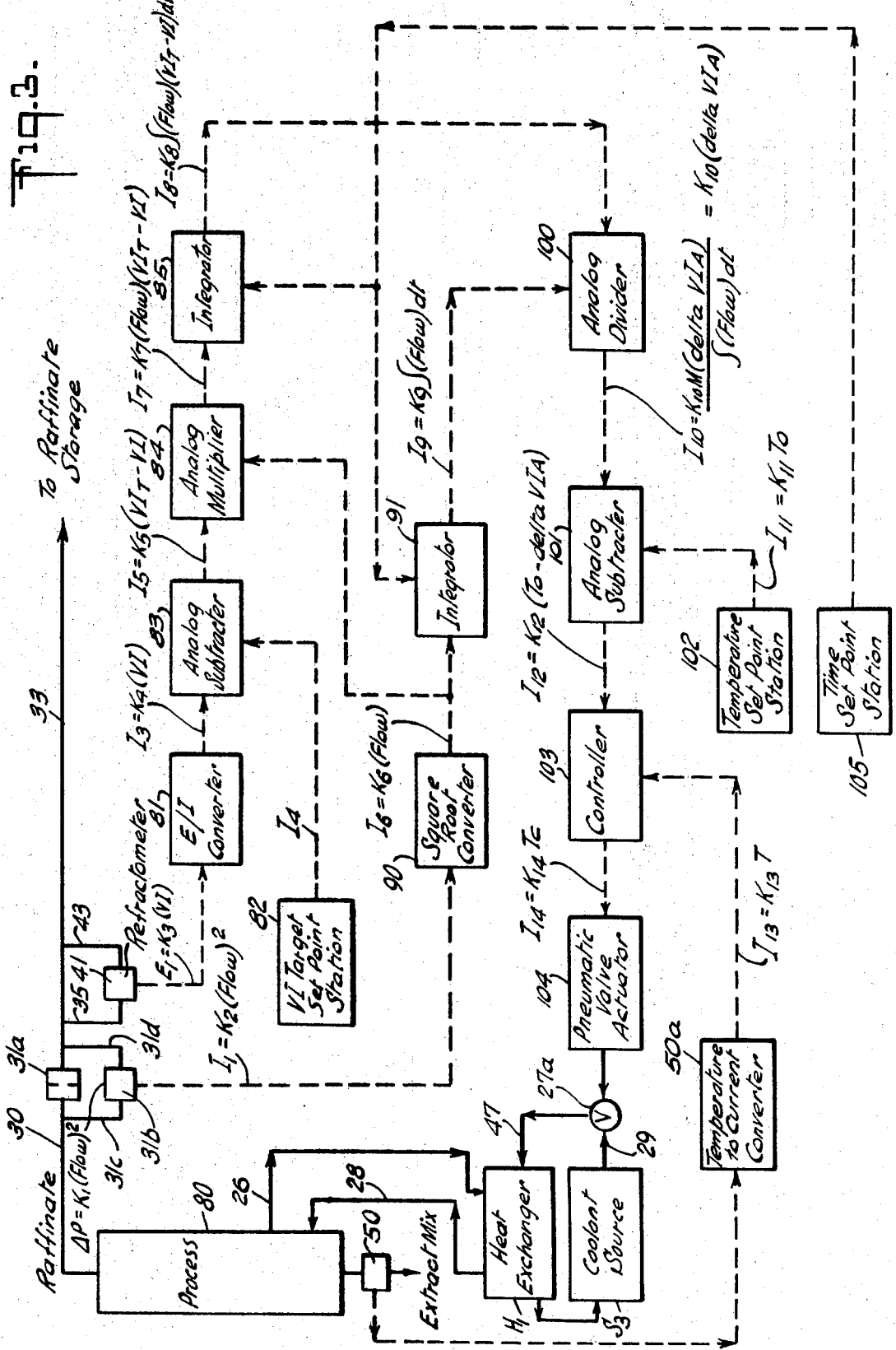

3,546,107
PROCESS AND APPARATUS TO CONTROL VI OF SOLVENT REFINED OIL
William F. Brown, Wappingers Falls, Charles H. Brodeur, Hyde Park, and William E. Crockett, Wappingers Falls, N.Y., assignors to Texaco Inc., New York, N.Y., a corporation of Delaware
Filed Jan. 11, 1968, Ser. No. 697,117
Int. Cl. C10g 21/00; B01d 11/00
U.S. Cl. 208—311                                    13 Claims

ABSTRACT OF THE DISCLOSURE

A method and apparatus for monitoring a physical characteristic of a process, or of a material treated in a process, and for control of the process in response to the average value or error of the measured characteristic, such as the viscosity index of a lubricating oil stock following treatment in a solvent refining process. A first signal is generated in response to a measurement of a physical characteristic which is representative of the viscosity index of the treated oil, such as, for example, the refractive index thereof. The treated oil is collected in a temporary storage container and a second signal representative of the average refractive index error of the oil collected in the container is generated by integration and comparison of the first signal with a reference specification value signal substantially concurrent with the flow of the treated oil to the container. In response corrections are computed of a controllable process variable such as the solvent dosage, and corrective commands are issued, to suitable process controls, which are programmed over a time interval at least shorter than the filling time of the container, whereby the average quality of the product is accurately controlled to the specification. In one embodiment apparatus is provided for control of a solvent refining process.

BACKGROUND OF THE INVENTION

This invention relates to a method and apparatus for monitoring and control of hydrocarbon treating processes, and more particularly, for monitoring and control of solvent refining processes of lubricating oil stocks.

It is generally a requirement of most chemical and oil refining processes to produce a product in accordance with a predetermined quality or specification value. Such a specification value generally refers to one or more particular physical characteristics of the product being produced and is usually related to one or more variables of the process. Also, in certain instances, the specification values may be of the process variables themselves.

Many oil refining processes are controlled in accordance with one or more such specification or target values of an important characteristic of the product, the process, or of the material under-going treatment in the process, which is usually related to the fundamental purpose of the process. Measurements are made of the characteristic which is subject, or related, to the specification controlled characteristic, either by automatic measuring equipment incorporated in the process, or by laboratory analysis, and the process is controlled in response to these measurements by making appropriate adjustments to the process controls, thereby tending to achieve the predetermined specification value. An example is the control of a hydro-finishing process for the improvement of the color of a lubricating oil by hydrogenation, where the process is controlled to achieve a target color value by control of the hydrogenation rate in response to a colorimeter measurement of the treated oil. Another example is control of a solvent refining process by adjustments of the solvent dosage in response to measurements of the refractive index of the product.

The foregoing methods of control, in accordance with the prior art, are generally subject to a serious disadvantage. Measurements are usually continuously made of a physical characteristic related to the predetermined specification value, or quality of the product, essentially concurrently with operation of the process and in response, corrective steps are taken over the process controllable variables as rapidly as possible in order to provide for maximum accuracy of control. Accordingly, when control of the process is thus predicated upon continuous instantaneous measurements, it is generally necessary to control the process in a manner so that the quality of the product exceeds the predetermined specification value to a certain extent in order to compensate for errors of measurement and control. Also, other uncertainties of the process such as variations in the composition of the charge stock, in performance of the process equipment, or the variations incurred during equipment startup, or process upset, all tend to increase the safety margin between the immediate control point objective, being the point of operation of the process, and the predetermined target or specification value of the quality of the product which the process must meet. To the extent of the difference between these two values the economy of the process is compromised. Therefore, in accordance with the prior art, it is difficult to fix, in advance, a realistic specification value, since when selecting this value there is a tendency to anticipate the degree to which the quality of the product will exceed this predetermined value in accordance with the aforementioned safety margin.

In view of the foregoing, it can be seen that the quality of the product varies and cannot be certified to as high a quality as it may otherwise be, absent the above uncertainties, or in the alternate, absent the use of a control system which will properly compensate therefor. Furthermore, in many processes the corrective control steps are manually performed, or entered, by an operator. This further introduces human errors of control and judgment which the operator himself must compensate for in the form of a further safety margin. As a consequence, the product is produced of a quality which varies and considerably exceeds the specification value. Nevertheless, the product cannot be certified to a higher quality due to the above uncertainties.

An example of the aforementioned control problem is the control of solvent refining processes to yield a lubricating oil stock of a given viscosity index. A major object of a solvent refining process is to remove from a lubricating oil stock fractions of the aromatics and other heavy components and impurities which have a detrimental effect on its viscosity index. The lubricating oil stock is contacted with a solvent such as furfural, or N-methyl-2-pyrrolidone (hereinafter referred to as NMP), in a conventional dosing tower resulting in an extract-stream mix containing the aromatics and impurities sought to be removed which leaves the tower from the bottom, and a raffinate stream of treated refined oil leaving the tower from the top. A preferred method by which the process may be controlled is to control both the solvent dosage and the tower bottom temperature. The former is the ratio of solvent to charge, and the latter is essentially the temperature of the extract mix. Another method is to control either variable singularly while maintaining the other essentially constant. As the solvent dosage is increased the viscosity index of the product is increased. As the tower bottom temperature is increased, the viscosity index of the product is increased since the solvent action is improved at higher temperatures. These and other process variables which may be used for purposes of control are generally controlled about a nominal or desired operating point predicated upon the design of the process equipment and the particular stock processed.

With reference to one example of a furfural refining process it has been determined that due to variations of the process equipment, and uncertainties of instrumentation and operator control, in order to certify a product quality of 90 viscosity index (ASTM designation: D-567), it is practice to produce oil consistently varying at or near 92 viscosity index, resulting in an efficiency penalty, or a yield loss of about 2.5%.

In view of the foregoing it is clear that an automatic control system is required which minimizes the various uncertainties indicated, whereby the process may be controlled in accordance with the average quality or quality deviation of the product. The invention as herein disclosed provides a solution to the aforementioned problems by a unique and novel method employing the use of measurement and computing apparatus in unique and novel combination resulting in ecoomic control for producing a product of consistently high quality.

SUMMARY

Briefly state, a preferred aspect of the invention provides a method for monitoring a physical characteristic of a process, or of a material treated in a process, and for control of the process in response to the average value, or deviation from specification, of the measured characteristic. Following treatment in the process, the material is collected in a container. A first signal is generated corresponding to a measurement of a given characteristic related to the specification-controlled parameter. A second signal, representative of the average value of the measured characteristic, is generated by integrating the first signal substantially concurrently with the flow of the treated material to the container. The second signal is useable to monitor the process and for this purpose is recorded. To control the process a third signal is generated in response to the first signal by integration and comparison of the first signal with a reference specification value signal substantially concurrently with the flow of the treated oil to the container. In response to the third signal corrective commands are issued to process control equipment required to achieve the predetermined target value as an average with respect to the material in the container.

Another aspect of the invention provides apparatus in novel combination which may be used for practicing the methods of the invention. In one embodiment, for monitoring and control of a solvent refining process, instrumentation means are provided for generating signals representative of the viscosity index of refined oil, the tower bottom temperature, and the raffinate flow rate. A suitable means for providing a signal representative of the viscosity index is a refractometer generating a signal corresponding to the refractive index of the refined oil. The instrumentation means are coupled to a computer. The computer includes integrating means for integrating the refractive index and flow rate signals, memory means for storing a signal corresponding to a predetermined target value of the refractive index, and comparison means for comparing the target value signal with a signal representative of the refractive index of the product. The computer also includes computing means responsive to the instrumentation means for computing corrections required of suitable controllable variables of the process in order to achieve the target refractive index value. Further means are provided, in the process equipment responsive to the computer for control of the controllable variables, for example, the solvent dosage and the extract-mix temperature.

In view of the foregoing it is an object of the invention to provide a simplified method for the automatic monitoring of processes.

Another object of the invention is to provide methods for monitoring and automatic control of processes responsive to a measurement of physical conditions related thereto.

Another object of the invention is to provide methods for automatic control of solvent refining processes responsive to measurements related to the average viscosity index deviation of the product.

Another object of the invention is to provide embodiments of apparatus to fulfil the aforementioned objectives.

These and other objects, advantages and features of the invention will be more fully understood by referring to the following description and claims taken in conjunction with the accompanying drawings.

BRIEF DESCRIPTION OF THE DRAWINGS

FIG. 1 is a schematic block diagram illustrating a solvent refining unit embodying features of the present invention to monitor and control the refining process.

FIG. 2 is a schematic block diagram illustrating an embodiment of a digital computing system which may be used as the computer shown in FIG. 1.

FIG. 3 is a schematic block diagram illustrating an embodiment of an analog control system employing features of the present invention which may be used to control the solvent refining process of FIG. 1.

DESCRIPTION OF THE PREFERRED EMBODIMENTS

Referring now to FIG. 1 which illustrates one form of method and apparatus for the practice of the invention adapted to monitor and control a solvent refining process. A lubricating oil stock to be solvent refined is preheated to a desired operating temperature and introduced into the system from a source S1 through a conduit 10. The conduit 10 is connected with an electrically operated flow control valve 11 which in turn is connected with a conduit 12 which carries the charge to a solvent refining tower 13. An appropriate solvent such as furfural or NMP is preheated and introduced into the system from a source S2 through a conduit 14. Connected with the conduit 14 is an electrically operated flow control valve 15 which is in turn connected with a conduit 16 which carries the solvent to the refining tower 13. The refining tower 13 is illustrated as a rotating disc countercurrent contacting tower containing rotating discs 17. However, other contacting devices may be employed, for example, box counterflow contactors, or a suitable packing material, or the like. In the tower 13 the oil and solvent are contacted in a countercurrent flow manner effecting extraction of impurities, the aromatics, and other low viscosity index constituents of the charge oil. A conduit 18 is connected with the top of the tower through which is withdrawn raffinate comprising the refined oil and a small amount of dissolved solvent. The conduit 18 carries the raffinate-mix to a solvent recovery facility 19 wherein the solvent is stripped from the refined oil. A conduit 20 connected with the solvent recovery facility 19 carries the stripped solvent to a temporary solvent storage and recirculation facility 21 from where the stripped solvent is recirculated to the solvent source S2. The extract-mix comprising a solution of the solvent with the aromatics and other low viscosity index components, is removed from the tower 13 through a conduit 22 which is connected with the bottom of the tower 13. The conduit 22 is also connected with a solvent recovery facility 23 to which the extract stream is introduced and wherein the solvent is stripped from the extract. The stripped solvent leaves the solvent recovery facility 23 through a conduit 24 connected therewith, and which is also connected with the solvent recirculation facility 21, wherein the stripped solvent is recirculated to the source $S_2$. Extract leaves the process through a conduit 25 connected with the solvent recovery facility. In order to provide for proper solvent action and to produce a product of uniform viscosity index it is necessary to maintain the temperature of the bottom of the tower at a fairly stable value. In solvent refining of lubricating oils this temperature is usually in the range of about 160° F. to 230° F. It is usually necessary to provide for some form of external cooling at the tower bottom in order to maintain the desired bottom temperature. In the embodiment illustrated in FIG. 1 of the drawings, a heat exchanger $H_1$ is provided for this purpose. A side-stream is removed from the tower through a conduit 26 connected therewith, and also connected with the heat exchanger $H_1$, where the side-stream is cooled and returns to the tower through a conduit 28 connected therewith. A coolant source $S_3$ is provided which circulates a suitable heat exchange fluid through the heat exchanger $H_1$. The heat exchange fluid enters the heat exchanger through a conduit 47 connected therewith and is withdrawn from the heat exchanger through a conduit 48 connected therewith and with the coolant source $S_3$. Connected with the conduit 47 is an electrically operated flow control valve 27 which is in turn connected with the coolant source $S_3$ by a conduit 29. The valve 27 modulates the flow of the heat exchange fluid through the heat exchanger in response to an electrical input signal, thereby modulating the temperature of the side-stream returning to the tower, which in turn has the effect of modulating and controlling the tower bottom temperature. The heat exchanger $H_1$ may be used to cool or heat the side-stream depending upon which effect is required, which of course depends upon the temperature chosen of the heat exchange fluid which is maintained by the coolant source $S_3$. However, the temperature of the heat exchange fluid should be maintained at a fairly constant value so that modulation of its flow by the valve 27 will result in accurate control of the tower bottom temperature. It should be noted that considerable variations of the former temperature may be tolerated since the valve 27 forms a part of a feed back control loop which continually responds to a temperature measurement made at the bottom of the tower, further discussed below.

Raffinate is removed from the solvent recovery facility 19 through a conduit 30 connected therewith, which is in turn connected with a flow meter 31 which generates a signal corresponding to the flow rate of raffinate passed through it and transmits this signal through a conduit 32 to a computer 36. Connected with the outlet of the flow meter is a conduit 33 which is in turn connected with a three-way valve 34, which depending upon its position will permit flow of the raffinate stream to either of temporary storage containers 37 or 38 singularly which are connected with the valve 34 through conduits 39 and 40, respectively. Two or more such storage containers may be used to enable continuous operation of the process by appropriate operation of the valve 34. While one container is being filled with currently produced raffinate, the others may be emptied by removal of raffinate for subsequent processing such as, for example, hydrofinishing or dewaxing operations. In the alternate, if one container is used, the process will be discontinuous. Also in the alternate, the temporary storage containers may be connected further upstream following subsequent operations such as hydrofinishing.

A side-stream of raffinate is passed through a refractometer 41 connected with the conduit 33 by conduits 35 and 43. The refractometer 41 generates a signal corresponding to the refractive index of the raffinate stream passed through it and transmits this signal through a suitable signal carrying conduit 42 to the computer 36. A suitable refractometer is that marketed by: Waters Associates, Framingham, Mass., under the designation In Line Refractometer. The refractive index signal with respect to most lubricating oil stocks is indicative of the viscosity index thereof and, in general, the refractive index decreases as the viscosity index is increased. In the alternate, a pair of viscosity meters measuring the viscosity at different temperatures, may be used in accordance with the prior art such as that described by J. M. Jones, Jr. in U.S. 2,791,902 and U.S. 3,025,232. In this instance the computer may calculate the viscosity index in accordance with ASTM D-567.

In those instances where it is advantageous to monitor the process the computer 36 continually integrates the refractive index signal, and the flow rate signal, and continually calculates the average refractive index of the raffinate collected in either of the storage containers 37 or 38 depending upon the position of the valve 34. A signal corresponding to the calculated average refractive index is transmitted from the computer 36 through a conduit 45 to a display device 46 such as a display meter or a chart recorder thereby obtaining a continual display of the refractive index of the raffinate in the storage container receiving the flow thereof.

To control the process, the computer generates a signal corresponding to the refractive index deviation of the raffinate collected in the container receiving the flow thereof by integration and comparison of the refractive index signal with a signal representative of the target or specification valve thereof.

It is to be readily appreciated by one skilled in the art that in those instances where the flow rate of the raffinate is not expected to vary appreciably, then the flow rate measuring device 31 may be omitted and the computations by the computer may be performed assuming the flow rate constant thereby simplifying the system. However, in the process illustrated in FIG. 1 of the drawings, the raffinate flow is expected to vary appreciably, thereby requiring the use of the flow meter 31 to enable the computer to accurately perform its calculations in reference to the raffinate collected in the container receiving the flow thereof.

Also, the computer receives information of the tower bottom temperature through a conduit 49 connected with a temperature measuring device 50 appropriately mounted at the bottom of the tower where it can sense the temperature of the extract-mix stream. Any of a variety of presently known temperature measuring devices may be used for this purpose, as for example, a resistance thermometer, or a thermocouple. The computer 36 also incorporates manual entry or pre-programming means whereby the predetermined target refractive index value may be pre-programmed in the computer. Also pre-programmed in the computer are the control functions, that is, the relationships between the bottom temperature and the refractive index of the product, and between the solvent dosage and the refractive index of the product. In response to the signal corresponding to the refractive index deviation of the raffinate the computer 36 issues corrective commands determined in accordance with the pre-programmed relationships to a temperature controller 51 and a flow proportioner 52, through conduits 53 and 54 respectively. The temperature controller 51 transmits a control signal through a conduit 55 adjusting the valve 27 to maintain the tower bottom temperature called for by the computer. The signal controlling the solvent dosage is transmitted from the computer 36 through the conduit 54 to the flow proportioner 52. The signal in the conduit 54 sets the control point in the flow proportioner 52 to maintain the computed ratio between solvent flowing to the tower in the conduit 16 and charge flowing to the tower in the conduit 12. The charge flow rate is set at some limiting value and is maintained at that value by a signal through a conduit 56 controlling the position of the valve 11. The flow proportioner 52, in response to its input signal from the computer, issues a ratio determining signal through a conduit 57 controlling the position of the valve 15 thereby controlling the solvent dosage ratio. It should be noted that the solvent dosage may also be controlled by modulating the charge flow rate while holding the solvent flow rate essentially constant, or by modulating both variables. It should also be noted that the various signal carrying conduits illustrated, such as 42, 54 and 55, may include any signal carrying means such as, for example, a tube, a wire or a lever, depending upon the nature of the signals and the type of computer used, that is, whether they be pneumatic, hydraulic, electrical or mechanical.

The control functions, i.e., the relationships between the refractive index of the product, the solvent dosage, and bottom temperature, must be determined in advance and programmed in the computer. These relationships are uniquely a function of the particular tower design and the charge stock processed. However, these relationships need not be accurately determined since in feedback control, such as is illustrated here, the refractive index deviation of the product is continually calculated in reference to the container receiving the flow thereof, so that control at or near a null operating point will result in a product of accurately controlled refractive index without requiring precise control relationships. For this purpose, therefore, the control relationships may be analytically or experimentally determined. It should be noted that a decreased refractive index of the product corresponds to an increased viscosity index thereof. As the tower bottom temperature is increased the refractive index of the product is decreased since the ability of the solvent to remove the low viscosity constituents of the charge is increased as the temperature is increased. Also, as the solvent dosage is increased, the refractive index of the product is decreased since there is greater separation ability with higher solvent dosages. One method by which the control relationships may be determined is: firstly, to establish a nominal or average best operating point of the tower in accordance with the prior art, then holding one of the controllable variables constant such as the bottom temperature, and varying the other controllable variable, i.e., the solvent dosage, a few data points may be obtained of the refractive index of the product correlated with the varied controllable variable. The procedure is then repeated with respect to the other variable, namely, the bottom temperature, thereby obtaining the required control relationships between both controllable variables and the refractive index of the product. These relationships are, of course, uniquely a function of the particular tower design and the charge processed.

In an example in reference to a particular rotating disc contacting tower containing about 900 barrels holdup of oil and solvent at a suitable operating point of 8000 barrels per day of charge of a particular stock, the preferred nominal or average operating point was determined to be a solvent dosage of 1.0 and a bottom temperature of 182° F. to produce an oil consistently of 90 viscosity index without raffinate recycle. A suitable extract recycle rate in this instance is about 2400 barrels per day consisting of 75% by volume of extract and 25% by volume of solvent, without recycle modulation. Under these conditions excursions of approximately 89 to 91 viscosity index of the raffinate correspond linearly to solvent dosage modulation in a range of 0.5 to 1.5. Also, under these conditions it was determined that similarly small excursions of about 89 to 91 viscosity index of the raffinate correspond approximately linearly to bottom temperature modulation in a range of 169° F. to 195° F. One mode of control is to have the computer hold the solvent dosage constant at the preselected nominal, or average operating point, and the bottom temperature may be varied to produce fine adjustments of the viscosity index of the product, in response to the computed average refractive index error thereof. When errors of the process occasionally become greater than the fine adjustment range of the bottom temperature modulation then the solvent dosage may be modulated. The threshold point of solvent dosage modulation is pre-programmed in the computer. In the example given above, the bottom temperature may be modulated in a linear manner to achieve variations of about ±1 viscosity index and to achieve greater variations the solvent dosage may be modulated.

Of course, the tower may be controlled by control of other variables. Such alternate methods include control of the extract recycle rate or of the raffinate recycle rate if either or both recycles are used. This is illustrated in reference to the raffinate recycle in FIG. 1 of the drawings in phantom line format by a conduit 60 representing the raffinate recycle. An electrically operated valve 61 connected with the conduit 60 in a raffinate recycle loop is shown, which responds to a control signal from the computer carried by a conduit 62. In this configuration, pressure energy means such as a pump interposed between the valve 61 and the main raffinate stream in the conduit 18 is required to cause the recycle flow. In this example as the raffinate recycle rate is increased by modulating the valve 61 toward its open direction the viscosity index of the product is increased. The control relationship between the position of the valve 61 and the viscosity index, or refractive index of the product is pre-programmed in the computer and may be determined as discussed above in reference to the solvent dosage and the tower bottom temperature. It is to be understood that modulation of the raffinate recycle, or of the extract recycle, may be used in accordance with the present invention either singularly or in unison, in lieu of, or in conjunction with, either or both the bottom temperature and the solvent dosage modulation discussed above.

Referring now to FIG. 2 which is a block diagram schematic of a digital computer system which may be utilized to perform the functions of the computer 36 discussed in reference to FIG. 1, signals representative of the refractive index of the raffinate, of the tower bottom temperature, and of the raffinate flow rate, are transmitted from the refractive index measuring device 41, the tower bottom temperature measuring device 50, and the flow meter 31, respectively, to an analog input sub-system 70. The input signals to the analog input sub-system 70 are converted therein into a digital form. A number of analog to digital converters are well known in the digital computer art. Once in digital form the information is transmitted to the arithmetic and control sub-system 71 for processing therein, and is also transmitted to the memory sub-system 72 for temporary storage and recall as required.

The arithmetic and control sub-system 71 has two fundamental functions: computing and manipulating digital quantities, and controlling and directing the internal computer functions. To accomplish these computing and control functions a set of programmable solid state electronic registers are provided and a set of non-programmable registers are provided which are used primarily in the computer execution sequence.

A program and input sub-system 73 is provided which conveys a program of instructions to the arithmetic and control sub-system 71. The program is entered into the program and input sub-system 73 by the use of conventional IBM program cards or magnetic tape. Also, through the program and input sub-system 73, the computer is provided with information of the relationships between the controllable variables, i.e., the bottom temperature and the solvent dosage, and the refractive index of the raffinate. As indicated in the discussion in reference to FIG. 1 these relationships may be approximated in linear form, or in the alternate, may be expressed to the computer as non-linear relationships. Also, through the program and input sub-system 73 the computer is provided with information of the threshold correction level defining the point of switchover from bottom temperature control to solvent dosage control in the form of a maximum error signal limiting value. A target value representing the desired refractive index of the raffinate is entered into the computer by an operator at the operator's console 74 which is coupled to the program and input sub-system 73.

In accordance with the present invention the computer continually generates a signal representative of the deviation from specification at any time of the raffinate collected in the storage container receiving a flow thereof by integration and comparison of the refractive index signal with a signal representative of the target value thereof. In response to the deviation signal the computer calculates and issues corrective commands required of the tower bottom temperature and the solvent dosage in accordance with the control relationships as discussed in reference to FIG. 1.

With reference to those processes in which the raffinate flow rate remains relatively constant a first and preferred procedure by which the deviation signal may be generated is for the arithmetic and control sub-system 71 continually: to subtract a signal representative of the measured refractive index from a signal representative of the target value thereof; to generate a signal corresponding to this difference which is thereby representative of the instantaneous refractive index error of the raffinate; to generate a signal representative of the product of the average refractive index error and the quantity of the raffinate collected in the storage container by integrating with respect to time the signal representative of the instantaneous refractive index error; to generate the deviation signal representative of the average refractive index error of the collected raffinate by dividing the above-integrated signal by a signal representative of the time elapsed during which the raffinate is collected in the container.

A second procedure by which the above deviation signal may be generated is for the arithmetic and control sub-system 71 continually: to generate a signal representative of the product of the average refractive index and the quantity of the collected raffinate by integrating with respect to time the signal representative of the measured refractive index; to generate a signal representative of the average refractive index of the collected raffinate by dividing the latter mentioned integrated signal by a signal representative of the time elapsed during which raffinate is collected in the container; to generate the deviation signal by subtracting a signal representative of the target refractive index value from the signal representative of the average refractive index of the collected raffinate.

A third procedure by which the above deviation signal may be generated is for the arithmetic and control sub-system continually: to generate a signal representative of the product of the average refractive index and the quantity of the collected raffinate by integrating with respect to time the signal representative of the measured refractive index; to generate a signal corresponding to the product of the quantity of collected raffinate and the target refractive index by multiplying a signal representative of the target refractive index value by a signal representative of the time elapsed during which raffinate is collected in the container; to generate a signal representative of the product of the average refractive index error and the quantity of the collected raffinate by subtracting the latter product signal from the former product signal; to generate the deviation signal corresponding to the average refractive index error of the collected raffinate by dividing the signal representative of the product of the average refractive index error and the quantity of the collected raffinate by the signal representative of the time elapsed during which raffinate is collected in the storage container.

In each of the foregoing procedures the last mentioned signal generated is continually representative of the average refractive index error of the collected raffinate and is used to control the process. It should be noted that the process may also be controlled in response to a signal representative of the product of the average refractive index error and the mass of the collected raffinate. To provide such a signal the above-mentioned first or third procedures may be used by omitting the last division steps therein.

With reference to those processes in which the raffinate flow rate is expected to vary appreciably a first and preferred procedure by which the refractive index deviation signal may be generated is for the arithmetic and control sub-system 71 continually: to generate a signal representative of the instantaneous refractive index error of the raffinate by subtracting a signal representative of the measured refractive index from a signal representative of the target value thereof; to generate a signal representative of the time differential of the product of the refractive index error and the quantity of the collected raffinate by multiplying the signal representative of the instantaneous refractive index error thereof by a signal representative of the raffinate flow rate; to generate a signal representative of the product of the refractive index error and the quantity of the collected raffinate by integrating with respect to time the above signal of the time differential thereof; to generate a signal representative of the quantity of the collected raffinate by integrating with respect to time the signal representative of the raffinate flow rate; to generate the deviation signal representative of the average refractive index error of the collected raffinate by dividing the signal representative of the product of the refractive index error and the quantity of the collected raffinate by the signal representative of the quantity of the collected raffinate.

A second procedure by which the above deviation signal may be generated is for the arithmetic and control sub-system 71 continually: to generate a signal representative of the time differential of the product of the refractive index and the quantity of the collected raffinate by multiplying the signal representative of the measured refractive index by the signal representative of the raffinate flow rate; to generate a signal representative of the product of the refractive index and the quantity of the collected raffinate by integrating with respect to time the above signal of the time differential thereof; to generate a signal representative of the quantity of the collected raffinate by integrating with respect to time the signal representative of the raffinate flow rate; to generate a signal representative of the average refractive index of the collected raffinate by dividing the above signal representative of the product of the refractive index and the quantity of the collected raffinate by the above signal representative of the quantity of the collected raffinate; to generate the deviation signal by subtracting the above signal representative of the average refractive index of the collected raffinate from the signal representative of the target refractive index value.

A third procedure by which the above deviation signal may be generated is for the arithmetic and control sub-system 71 continually: to generate a signal representative of the time differential of the product of the refractive index and the quantity of the collected raffinate by multiplying the signal representative of the measured refractive index by the signal representative of the raffinate flow rate; to generate a signal representative of the product of of the refractive index and the quantity of the collected raffinate by integrating with respect to time the above signal of the time differential thereof; to generate a signal representative of the time differential of the product of the target refractive index and the quantity of the collected raffinate by multiplying the signal representative of the target refractive index by the signal representative of the raffinate flow rate; to generate a signal representative of the product of the target refractive index and the quantity of the collected raffinate by integrating with respect to time the above signal of the time differential thereof; to generate a signal representative of the product of the refractive index error and the quantity of the collected raffinate from the above signal representative of the product of the target refractive index and the quantity of the collected raffinate; to generate a signal representative of the quantity of the collected raffinate by integrating with respect to time the signal representative of the raffinate flow rate; to generate the deviation signal representative of the average refractive index error of the collected raffinate by dividing the above signal representative of the product of the refractive index error and the quantity of the collected raffinate by the above signal of the quantity of the collected raffinate.

As indicated above the process may also be controlled in response to a signal representative of the product of the average refractive index error and the mass of the collected raffinate. To provide such a signal the last mentioned first or third procedures may be used by omitting the last division and the next to the last integration steps therein.

The arithmetic and control sub-system 71, in reference to any one of the foregoing procedures performs the appropriate mathematical functions and transmits output information to a print-out sub-system 75 and an analog output sub-system 76. The print-out sub-system 75 provides a print-out of the running average of the refractive index of the collected raffinate as a record of the process. The analog output sub-system 76 converts the computer generated control signals which are in digital form into analog voltages which are thereby compatible with the temperature controller 51 and the flow proportioner 52. A counter 77 is provided to continuously supply information of the elapsed time to the arithmetic and control sub-system 71 and for timing of the various computer functions. The elapsed time is measured from the point of beginning of the raffinate flow to either of the storage containers 37 or 38. That point is manually entered by an operator at the operator's console 74, or in the alternate, the filling time may be pre-programmed in the computer and switchover between the storage containers 37 and 38 may be performed by the computer as an automatic control function. In this case the switch-over function triggers the counter to restart its time count.

Due to the flexibility of a digital computer system it is to be understood by one skilled in the art that some of the foregoing steps, discussed above and in reference to FIG. 1, may be interchanged or simplified and yet result in a workable control system in accordance with this disclosure. It should also be understood that while some of these computing and control steps have been described as continual, an equivalently operable control system results if the steps are performed periodically, for example, once a second, once every five minutes, or periodically between longer time intervals provided such time intervals are not appreciably great with respect to the time interval of filling the storage container which would thereby introduce appreciable errors of control.

Referring now to FIG. 3, which is a schematic block diagram illustrating an embodiment of an analog control system which may be used to control the solvent refining process of FIG. 1, the refining process is illustrated by a block 80 which includes the following apparatus illustrated in FIG. 1: the charge souce $S_1$; the solvent source $S_2$; the refining tower 13; the solvent recovery facilities 19 and 23; the solvent recirculation facility 21; the raffinate storage containers 37 and 38; the raffinate flow control valve 34; and all the interconnecting conduits therein illustrated. Raffinate is removed from the process 80 through a conduit 30 to which is connected an orifice plate 31a through which the flow of raffinate passes. The flow of raffinate therethrough causes a differential pressure across the orifice plate which is related to the square of the flow rate thus:

$$\Delta P = K_1 (\text{Flow})^2$$

$\Delta P$=the differential pressure across the orifice plate.
$K_1$=a proportionality constant.

The differential pressure across the orifice plate 31a is sensed by a differential pressure transducer 31b connected therewith by conduits 31c and 31d. The differential pressure transducer 31b generates an electrical current output signal $I_1$ proportional to the square of the raffinate flow rate thus:

$$I_1 = K_2 (\text{Flow})^2$$

where:
$K_2$=a proportionality term which includes the gain or scale factor of the differential pressure transducer 31b. For this purpose a number of differential pressure transducers presently known in the art may be used.

The raffinate stream passes through the conduit 33 to the temporary storage containers 37 and 38 as discussed in reference to FIG. 1. A side-stream of the raffinate is passed through a refractometer 41 connected with the conduit 33 by conduits 35 and 43. The refractometer 41 is in accordance with that discussed in reference to FIG. 1 and generates an electrical voltage output signal $E_1$ linearly related to the viscosity index of the raffinate thus:

$$E_1 = K_3 (VI)$$

where:

$K_3$=a proportionality term which includes the gain or scale factor of the refractometer and,
$VI$=the viscosity index of the raffinate.

The signal generated by the refractometer is transmitted to a voltage to current converter 81 which generates and provides an electrical current output signal $I_3$ proportional to its input $E_1$ thus:

$$I_3 = K_4 (VI)$$

where:

$K_4$=a proportionality term which includes the gain or scale factor of the converter 81.

For this purpose a number of voltage to current converters presently known in the art may be used.

The target or specification value of the viscosity index of the raffinate is manually entered at a VI target setpoint station 82 which generates an electrical output current signal $I_4$ proportional to the position of a manual control knob incorporated therein. For this purpose a manual control station Model M/67TG manufactured by the Foxboro Company of Foxboro, Mass. (hereinafter referred to as Foxboro), may be used. The signal $I_4$ representing the VI target value is transmitted from the set-point station 82 to an analog subtracter 83. Also transmitted to the analog subtracter 83 is the signal $I_3$, from the voltage to current converter 81, representative of the viscosity index of the product. The analog subtracter 83 subtracts the latter signal from the former and provides an electrical current output signal $I_5$ corresponding to this difference, namely, the deviation from the target viscosity index of the raffinate introduced into the storage container receiving a flow thereof. A suitable analog subtracter which may be used for this purpose is the Foxboro Model 66C. The signal $I_5$ may be thus expressed:

$$I_5 = K_5 (VI_t - VI)$$

where:

$VI_t$=the target or specification viscosity index value.
$K_5$=a proportionality term which includes the gain or scale factor of the analog subtracter 83.

The output signal $I_1$ of the differential pressure transducer 31b is transmitted to a square root converter 90 which generates and provides an electrical current output signal $I_6$ which corresponds to the square root of its input signal $I_1$. Hence, the output signal $I_6$ of the square root converter 90 is proportional to and represents the measured flow rate of the raffinate stream thus:

$$I_6 = K_6 (\text{Flow})$$

where:

$K_6$=a proportionality term which includes the gain or scale factor of the square root convertor 90.

For this purpose a Foxboro Model T66A square root converter may be used. The output signal $I_6$ of the square root converter 90 is transmitted to an analog multiplier 84 and an integrating device 91. Also transmitted to the analog multiplier 84 is the signal $I_5$, from the analog subtracter 83, corresponding to the deviation or error of the viscosity index of the product. The analog multiplier 84 generates and provides an electrical current output signal $I_7$ corresponding to the product of its input signal $I_5$ and $I_6$ thus:

$$I_7 = K_7(\text{Flow})(VI_t - VI)$$

where:

$K_7$=a proportionality term which includes the gain or scale factor of the analog multiplier 84.

The signal $I_7$ from the analog multiplier 84 is transmitted to an integrating device 85 which generates and provides an electrical current output signal $I_8$ which corresponds to the integral with respect to time of its input signal $I_7$ thus:

$$I_8 = K_8 \int (\text{Flow})(VI_t - VI) dt$$

where:

$K_8$=a proportionality term which includes the gain or scale factor of the integration device 85.

Since the integral with respect to time of the raffinate flow rate corresponds to the total quantity of the raffinate collected in the storage container, it can be seen that the signal $I_8$ corresponds to the product of the total mass of raffinate collected in the container and the average viscosity index deviation thereof thus:

$$I_8 = M(\text{delta } VI_A)$$

where:

M=the total mass collected in the container at any time.
delta $VI_A$=the average viscosity index deviation of the contents of the container, namely, the average value of the difference between the target viscosity index and the actual viscosity index of the collected raffinate.

The signal $I_6$ corresponding to the raffinate flow rate is also transmitted from the square root converter 90 to an integration device 91 which generates and provides an electrical current output signal $I_9$ corresponding to the integral with respect to time of the measured flow rate thus:

$$I_9 = K_9 \int (\text{Flow}) dt$$

where:

$K_9$=a proportionality term which includes the gain or scale factor of the integration device 91.

Analog integration devices which may be used as the devices 85 and 91 are well known in the art. Such as, for example, a variable speed servo-mechanism the speed of which corresponds to an input voltage developed across an input resistor by the input current signal. The position of an output shaft of such a servo-mechanism incorporating therein a gear train of appropriate gear ratio corresponds to the time integral of the input current signal. A potentiometer, as presently known in the art, coupled to such a servo-mechanism output shaft and connected with an appropriate voltage or power source of a stable value will provide a current output corresponding to the time integral of the input current signal. An alternate mechanism which may be used is that marketed by the GE/MAC division of the General Electric Corporation, West Lynn, Mass., as the Type 561 electric flow integrator, which integrates an electrical current input signal and provides a corresponding shaft position as an output. The output shaft may be coupled to a multiple-turn potentiometer as above to provide an electrical current output signal.

The signals $I_8$ and $I_9$ from the integration devices 85 and 91, respectively, are transmitted to an analog divider 100 which divides the former signal by the latter and generates an output electrical current signal $I_{10}$ corresponding to this quotient thus:

$$I_{10} = \frac{K_{10} M(\text{delta } VI_A)}{\int (\text{flow}) dt} = K_{10}(\text{delta } VI_A)$$

where:

$K_{10}$=a proportionality term which includes the gain or scale factor of the analog divider 100.

A suitable analog divider which may be used for this purpose is the Foxboro Model 66D. Since the denominator in the above equation is the integral with respect to time of the raffinate flow rate, that is, the total accumulated quantity of raffinate in the container receiving a flow thereof, it can be seen that the quotient or output signal $I_{10}$ from the analog divider 100 corresponds to the average viscosity index deviation of the collected raffinate at any time.

The signal $I_{10}$ from the analog divider 100 is transmitted to an analog subtracter 101 which is similar to the analog subtracter 83. Also transmitted to the analog subtracter 101 is a signal $I_{11}$ from a temperature set-point station 102 which is similar to the viscosity index set-point station 82. The temperature set-point station 102 is manually controlled whereby the desired average or nominal tower bottom temperature, $T_0$, is entered by an operator. The analog subtracter 101 subtracts from the bottom temperature set-point signal $I_{11}$, the average viscosity index error signal $I_{10}$, and generates an electrical current output signal $I_{12}$ corresponding to this difference thus:

$$I_{12} = K_{12}(T_0 - \text{delta } VI_A)$$

where:

$K_{12}$=a proportionality term which includes the gain or scale factor of the analog subtracter 101.

The scale factors of the analog divider 100 and of the temperature set-point station 102 are selected such that the input signal $I_{10}$ to the analog subtracter 101 representing the average viscosity index error of the raffinate is of a comparable analog temperature scale with the input signal, thereto, $I_{11}$ in accordance with the relationship of the bottom temperature with the viscosity index of the product. This relationship is determined as discussed in reference to FIG. 1. Therefore, the output signal $I_{12}$ of the analog subtracter 101 corresponds to the desired bottom temperature control point modulated in accordance with the average viscosity index error at any time of the collected raffinate.

The tower bottom temperature is measured by the temperature measuring device 50 which transmits a signal representative thereof to a temperature to current converter 50a which generates and provides an electrical current signal $I_{13}$ which is proportional to the measured bottom temperature. The signals $I_{12}$ and $I_{13}$ corresponding respectively, to the desired modulated bottom temperature, and the sensed or measured bottom temperature, are transmitted to a controller 103 which compares the two signals and issues an electrical current analog control signal $I_{14}$ which corresponds to the tower bottom temperature required to offset the accumulated average viscosity index error of the collected raffinate represented by the signal $I_{12}$. The output signal $I_{14}$ of the controller 103 may be thus expressed:

$$I_{14} = K_{14} T_c$$

where:

$T_c$=the tower bottom temperature required to offset the average accumulated viscosity index error of the raffinate and,
$K_{14}$=a proportionality term which includes the gain or scale factor of the controller 103.

For this purpose a Foxboro Model M-62 controller incorporating proportional and reset control modes may be used.

It is to be understood that while the controller output signal $I_{14}$ as mathematically expressed above is in accordance with proportional control mode as known in the art, that it is within the scope of the present disclosure that the controller provides control in both the proportional and reset control modes. One advantage to the use of the reset control mode is that the controller compensates for the offset error which is inherent to most controllers. It is known in the present art that the value of the output signal of a controller will be different from its set-point or ideal output value to an extent which is inversely proportional to the gain or sensitivity of the controller. To eliminate this the reset or integral mode acts to adjust the output so that at steady state it equals or is proporional to its ideal output value. To do this the controller in its reset mode incorporates in its output computation a multiplier term which corresponds to the time integral of the error signal.

The output signal $I_{14}$ of the controller 103, representing the commanded bottom temperature, is transmitted to a pneumatic valve actuator 104 which incorporates a current to air converter such as the Foxboro Model 69TA-1 and a suitable pneumatic valve operator. The output signal of the pneumatic valve actuator 104 is transmitted to a pneumatically operated flow control valve 27a, and is a pressure analog representation of its input signal $I_{14}$. A number of pneumatic valve and valve operators presently known in the art may be used. The valve 27a modulates the flow of the heat exchange fluid through the heat exchanger $H_1$ thereby controlling the tower bottom temperature as discussed above in reference to FIG. 1. A manually operated zero time set-point station 105 is provided to reset the integration devices 85 and 91 to zero time and is operated approximately concurrently with the raffinate flow control valve 34 to insure that the integration devices begin their respective computations concurrent with the beginning of the raffinate flow to either one of the storage containers. In the alternate the switch-over of the valve 34 and the reset of the integration devices 85 and 91 may be automated as discussed above in reference to FIG. 2.

While the foregoing description in reference to FIG. 3 has been directed to control of the tower bottom temperature it is to be understood that it is directed with equal effect to control of the solvent dosage. For the purpose of solvent dosage control, the system remains essentially as illustrated above and the output of the pneumatic valve actuator 104 may be used to control a pneumatically operated valve in either the solvent line or the charge line to the tower thereby modulating the solvent dosage. In the alternate the output $I_{14}$ of the controller 103 may be directly introduced into an electrical flow proportioner as discussed above in reference to FIG. 1.

It is to be understood that the terms, inclusively $K_1$ through $K_{12}$ above, include the respective gain or scale factors of each equipment item illustrated. It is known practice in accordance with the analog computing art that such scale factors are selected to provide signals of comparable scale between interfacing equipment to insure that the computational steps are performed in an appropriate analog scale. It should be noted that such scale factors may be altered or modified by the use of scaling amplifiers of appropriate gain or attenuation within the computational and control loop. It is also to be appreciated by one skilled in the art that the overall loop gain from the refractometer 41 to the control valve 27a is representative of the applicable control relationship, that is, the relationship between the tower bottom temperature, or the solvent dosage, and the refractive index of the product as discussed in reference to FIG. 1.

It is to be appreciated by one skilled in the art that an operable control system in accordance with this disclosure results if the integration device 91 and the analog divider 100 are omitted. In this instance the signal $I_{10}$ entering the analog subtracter 101 in the absence of the above equipment represents at any time the product of the mass of raffinate collected in the storage container and the average viscosity index error of the contents of the storage container. Accordingly, in such an embodiment of the system, the output signal $I_{12}$ of the analog subtracter 101 represents the temperature set-point or nominal bottom temperature modulated, or corrected, in accordance with the product of the average viscosity index error of the raffinate and the accumulated mass of the collected raffinate. The controller 103, in this example, thereby controls the process tending to offset the total accumulated viscosity error of the product. This mode of operation is preferred in those processes and applications where deviations of the product are of a relatively small excursion. However, for those processes such as the solvent refining process illustrated it is preferred to include the integration device 91 and the analog divider 100 since the division step performed by the latter component removes the mass term, that is the term representative of the quantity of the collected raffinate, from the signal $I_{10}$. This tends to stabilize the signal $I_{10}$ and further to prevent the signal from exceeding the range of the analog components subsequent in the system.

It is to be also appreciated by one skilled in the art that with reference to control of those processes wherein the raffinate flow rate is not expected to vary appreciably that an operable control system in accordance with this disclosure results if the following items illustrated in FIG. 3 are omitted: the flow rate measuring means 31a and 31b; the square root converter 90; the integration device 91; and the analog multiplier 84. In this example, the integration device 91 is replaced by an elapsed time counter which similarly responds to the time set-point station 105 and similarly transmits an electrical current output signal to the analog divider 100 which in this instance corresponds to the time elapsed from the commencement of the raffinate flow to either one of the storage containers. In this example the balance of the system illustrated in FIG. 3 performs the steps discussed in reference thereto, under the assumption that the raffinate flow rate remains constant by the omission of the above mentioned equipment, and the process is accordingly controlled in response to the average viscosity index error of the accumulated raffinate. In the alternate, the process may be controlled in response to the product of the quantity of the collected raffinate and the average viscosity index error thereof by the further omission of the above mentioned elapsed time counter and the analog divider 100.

While the invention has been described with a certain degree of particularity, it can, nevertheless, be seen by the examples hereinabove set forth that many modifications and variations of the invention may be made without departing from the spirit and scope thereof.

We claim:

1. A method for automatic control of a solvent refining process of an oil stock in accordance with a predetermined target value of the viscosity index of said oil refined in said process by controlling a controllable variable of said refining process affecting said viscosity index, comprising the steps of:
   (a) collecting said oil in a container at a substantially uniform flow rate following treatment thereof in said process;
   (b) generating a first signal representative of the viscosity index of said oil introduced into said container;
   (c) generating a second signal representative of said target value of said viscosity index of said oil;
   (d) generating a third signal representative of the difference between said viscosity index first signal and said target value second signal, thereby providing a third signal representative of the viscosity index error of said oil introduced into said container;
   (e) generating a fourth signal representative of the integral with respect to time of said difference third signal, between time limits within which occurs flow of said material into said container, thereby providing said fourth signal representative of the product of said viscosity index error of said oil and the quantity thereof accumulated in said container between said time limits; and, (f) controlling said process variable in response to said fourth signal in a manner tending to reduce said viscosity index error of said oil accumulated in said container, thereby tending to achieve said target value of said viscosity index of said oil in said container.

2. The method of claim 1 wherein said step (e) of generating a fourth signal comprises the steps of:
  (ea) generating a fifth signal representative of the flow rate of said oil introduced into said container;
  (eb) generating a sixth signal representative of the product of said viscosity index error third signal multiplied by said flow rate fifth signal, thereby providing a sixth signal representative of the differential of the product of the viscosity index error and the quantity of the oil accumulated in said container; and,
  (ec) generating said fourth signal to represent the integral with respect to time of said differential sixth signal, thereby providing said fourth signal to represent the product of said viscosity index error of said oil and the quantity thereof accumulated in said container, whereby said solvent refining process is controlled in response to said fourth signal tending to achieve said target value of said viscosity index of said oil accumulated in said container.

3. The method of claim 2 wherein said step (ec) of generating said fourth signal comprises the steps of:
  (eca) generating a seventh signal representative of the integral of said time differential sixth signal, thereby providing a seventh signal representative of the product of said viscosity index error of said oil and quantity thereof accumulated in said container;
  (ecb) generating an eighth signal representative of the integral with respect to time of said flow rate fifth signal, thereby providing an eighth signal representative of the quantity of said oil accumulated in said container; and,
  (ecc) generating said fourth signal to represent the quotient of said integral seventh signal divided by said quantity eighth signal, thereby providing said fourth signal to represent the average value of said viscosity index error of said oil accumulated in said container, whereby said solvent refining process is controlled in response to said fourth signal tending to achieve said target value of said viscosity index of the average of said oil accumulated in said container.

4. The method of claim 1 wherein said step (e) of generating said fourth signal comprises the steps of:
  (ea) generating a fifth signal representative of the flow rate of said oil introduced into said container;
  (eb) generating a sixth signal representative of the product of said viscosity index first signal multiplied by said flow rate fifth signal, thereby providing a sixth signal representative of the differential of the product of the viscosity index and the quantity of said oil accumulated at said container;
  (ec) generating a seventh signal representative of the integral with respect to time of said differential sixth signal, thereby providing a seventh signal representative of the average viscosity index and the quantity of said oil accumulated in said container;
  (ed) generating an eighth signal representative of the integral with respect to time of said flow rate fifth signal, thereby providing an eighth signal representative of the quantity of said oil accumulated in said container;
  (ef) generating a ninth signal representative of the quotient of said integral seventh signal divided by said quantity eighth signal, thereby providing a ninth signal representative of the average viscosity index of said oil accumulated in said container; and,
  (eg) generating said fourth signal to represent the difference between said target viscosity index second signal and said average viscosity index ninth signal, thereby providing said fourth signal to represent the average viscosity index error of said oil accumulated in said container; whereby said solvent refining process is controlled in response to said fourth signal tending to achieve said target value of said viscosity index of the average of said oil accumulated in said container.

5. The method of claim 1 wherein said controlling step (f) includes controlling said solvent refining process by modulating the solvent dosage thereof.

6. The method of claim 1 wherein said controlling step (f) includes controlling said solvent refining process by modulating the extract-mix temperature thereof.

7. An apparatus for control of a solvent refining process of an oil stock in accordance with a predetermined target value of a quality of said oil treated in said process representative of the viscosity index thereof comprising:
  (a) a container coupled with the equipment of said process for collecting said oil therein following treatment thereof in said process;
  (b) first instrumentation means for generating a first signal representative of said quality of said oil introduced into said container;
  (c) means including a computer coupled with said instrumentation means (b) for computing and generating a second signal representative of the error of said quality of said oil accumulated in said container with respect to said target value thereof, said computer means including;
    (ca) entry means for entering into said computer said target value of said quality, and for entering into said computer information of the relationship between said process controllable variable and said quality of said oil treated in said process;
    (cb) memory means coupled with said manual entry means for storing said target value and said controllable variable relationship information entered by said entry means; and,
    (cc) computing means coupled with said memory means and coupled with said first instrumentation means (b) for computing and generating a signal representative of the average error of said quality of said oil accumulated in said container and in response thereto for providing said second signal to correspond to the corrections of said process controllable variable required to achieve said target value of said quality of said oil collected in said container in accordance with said relationship; and
  (d) control means coupled with said computer means (c) for controlling a controllable variable of said process related to said quality of said oil treated therein, said control means being responsive to said second signal and controlling said controllable variable tending to reduce said error of said quality of said oil, whereby said process is controlled tending to achieve said target value of said quality of said oil collected in said container.

8. An apparatus for control of a solvent refining process of an oil stock in accordance with a predetermined target value of a quality of said oil treated in said process representative of the viscosity index thereof comprising:
  (a) a container coupled with the equipment of said process for collecting said oil therein following treatment thereof in said process;
  (b) first instrumentation means for generating a first signal representative of said quality of said oil introduced into said container;
  (c) means including a computer coupled with said instrumentation means (b) for computing and generating a second signal representative of the error of said quality of said oil accumulated in said container with respect to said target value thereof, said computer means including;

(ca) target value entry means for entering therein said target value of said quality of said oil and for generating a third signal corresponding thereto;

(cb) first difference measuring means coupled with said first instrumentation means and coupled with said target value entry means for generating a fourth signal corresponding to the difference between said target value third signal and said first instrumentation means first signal, thereby providing a fourth signal corresponding to the instantaneous error of said quality of said oil introduced into said container; and, (cc) first integration means coupled with said first difference measuring means for generating said second signal to represent the accumulated error of said quality of said oil in said container by integration of said fourth signal with respect to time; and, (d) control means coupled with said computer means (c) for controlling a controllable variable of said process related to said quality of said oil treated therein, said control means being responsive to said second signal and controlling said controllable variable tending to reduce said error of said quality of said oil, whereby said process is controlled tending to achieve said target value of said oil accumulated in said container.

9. An apparatus for control of a solvent refining process of an oil stock in accordance with a predetermined target value of a quality of said oil treated in said process representative of the viscosity index thereof comprising:

(a) a container coupled with the equipment of said process for collecting said oil therein following treatment thereof in said process;

(b) first instrumentation means for generating a first signal representative of said quality of said oil introduced into said container;

(c) means including a computer coupled with said instrumentation means (b) for computing and generating a second signal representative of the error of said quality of said oil accumulated in said container with respect to said target value thereof, said computer means including;

(ca) target value entry means for entering therein said target value of said quality of said oil and for generating a third signal corresponding thereto;

(cb) first difference measuring means coupled with said first instrumentation means and coupled with said target value entry means for generating a fourth signal corresponding to the difference between said target value third signal and said first instrumentation means first signal, thereby providing a fourth signal corresponding to the instantaneous error of said quality of said oil introduced into said container;

(cc) first flow rate measuring means coupled with said container for generating a fifth signal corresponding to the flow rate of said oil introduced into said container;

(cd) first multiplying means coupled with said first difference measuring means (cb) and coupled with said first flow rate measuring means (cc) for generating a sixth signal corresponding to the product of said difference fourth signal and said flow rate fifth signal, said first multiplying means thereby providing a sixth signal corresponding to the differential of the error of said quality of said oil introduced into said container; and (ce) first integration means coupled with said first multiplying means (cd) for generating said second signal to represent the accumulated error of said quality of the accumulated quantity of said oil in said container by integration with respect to time of said product sixth signal; and, (d) control means coupled with said computer, means (c) for controlling a controllable variable of said process related to said quality of said oil treated therein, said control means being responsive to said second signal and controlling said controllable variable tending to reduce said error of said quality of said oil, whereby said process is controlled tending to achieve said target value of said oil accumulated in said container.

10. An apparatus for control of a solvent refining process of an oil stock in accordance with a predetermined target value of a quality of said oil treated in said process representative of the viscosity index thereof comprising:

(a) a container coupled with the equipment of said process for collecting said oil therein following treatment thereof in said process;

(b) first instrumentation means for generating a first signal representative of said quality of said oil introduced into said container;

(c) means including a computer coupled with said instrumentation means (b) for computing and generating a second signal representative of the error of said quality of said oil accumulated in said container with respect to said target value thereof, said computer means including;

(ca) target value entry means for entering therein said target value of said quality of said oil and for generating a third signal corresponding thereto;

(cb) first difference measuring means coupled with said first instrumentation means and coupled with said target value entry means for generating a fourth signal corresponding to the difference between said target value third signal and said first instrumentation means first signal, thereby providing a fourth signal corresponding to the instantaneous error of said quality of said oil introduced into said container;

(cc) first flow rate measuring means coupled with said container for generating a fifth signal corresponding to the flow rate of said oil introduced into said container;

(cd) first multiplying means coupled with said first difference measuring means (cb) and coupled with said first flow rate measuring means (cc) for generating a sixth signal corresponding to the product of said difference fourth signal and said flow rate fifth signal, said first multiplying means thereby providing a sixth signal corresponding to the differential of the error of said quality of said oil introduced into said container;

(ce) first integration means coupled with said first multiplying means (cd) for generating a seventh signal corresponding to the product of the average error of said quality of said oil accumulated in said container and the quantity thereof by integration with respect to time of said product sixth signal;

(cf) second integration means coupled with said first flow rate measuring means (cc) for generating an eighth signal corresponding to the quantity of said oil accumulated in said container by integrating said fifth flow rate signal with respect to time; and (cg) first dividing means coupled with said first integration means (ce) and coupled with said second integration means (cf) for generating said second signal to correspond to the average error of said quality of said oil accumulated in said container by dividing said product seventh signal by said quantity eighth signal; and (d) control means coupled with said computer means (c) for controlling a controllable variable of said process related to said quality of said oil treated therein, said control means being responsive to said second signal and controlling said controllable variable tending to reduce said error of said quality of said oil, whereby said process is controlled tending to achieve said target value of said quality of said oil, as an average thereof, in said container.

11. An apparatus according to claim 10 wherein said control means (d) includes a process controller comprising:
  (da) manual entry means for entering into said controller a ninth signal representative of the nominal operating value of the solvent dosage of said solvent refining process;
  (db) controller means coupled with said manual entry means (da) and coupled with said first dividing means (cg) for modulating said solvent dosage operating value ninth signal in accordance with said error second signal and for providing a control tenth signal corresponding thereto; and said control means (d) further comprising:
  (dc) automatic valve means responsive to said modulated tenth signal coupled with the solvent inlet conduit of said solvent refining process and coupled with said controller means (db) for controlling the solvent flow rate to said process in response to said tenth signal whereby said process is controlled by modulation of the solvent dosage thereof thereby tending to achieve said target value of said quality of said oil accumulated in said container.

12. An apparatus according to claim 11 wherein said automatic valve means is coupled with the charge oil inlet conduit of said solvent refining process and coupled with said controller means (db) whereby said solvent dosage is controlled by control of the charge oil flow rate to said process in response to said modulated tenth signal thereby tending to achieve said target value of said quality of said oil accumulated in said container.

13. An apparatus according to claim 10 wherein said solvent refining process is at least in part performed in a solvent refining tower, wherein said control means (d) includes a process controller comprising:
  (da) manual entry means for entering into said controller a ninth signal representative of the nominal operative value of the extract-mix temperature of said solvent refining process;
  (db) controller means coupled with said manual entry means (da) and coupled with said first dividing means (cg) for modulating said extract-mix operative value ninth signal in accordance with said error second signal and for providing a control tenth signal corresponding thereto; and said control means (d) further comprising:
  (dc) controllable heat exchange means responsive to said control tenth signal coupled with the extract-stream end of said solvent refining tower for modulating the temperature of said portion of said tower in response to said tenth signal whereby said process is controlled by modulation of said temperature thereby tending to achieve said target value of said quality of said oil accumulated in said container.

References Cited

UNITED STATES PATENTS

| | | | |
|---|---|---|---|
| 2,737,469 | 3/1956 | Anderson et al. | 208—335 |
| 2,771,149 | 11/1956 | Miller et al. | 208—341 |
| 3,285,846 | 11/1966 | King et al. | 208—28 |
| 3,309,308 | 3/1967 | Schad | 208—178 |

HERBERT LEVINE, Primary Examiner

U.S. Cl. X.R.

196—14.52; 235—151.12, 151.13